(12) United States Patent
Kim

(10) Patent No.: US 9,541,023 B2
(45) Date of Patent: Jan. 10, 2017

(54) METHOD AND SYSTEM FOR DETERMINING CAUSES OF ENGINE STOP USING IGNITION POWER MONITORING

(71) Applicants: Hyundai Motor Company, Seoul (KR); Kia Motors Corporation, Seoul (KR)

(72) Inventor: Seung-Bum Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 288 days.

(21) Appl. No.: 14/554,576

(22) Filed: Nov. 26, 2014

(65) Prior Publication Data

US 2016/0032858 A1 Feb. 4, 2016

(30) Foreign Application Priority Data

Aug. 1, 2014 (KR) .................. 10-2014-0099169

(51) Int. Cl.
| | |
|---|---|
| *F02P 17/00* | (2006.01) |
| *F02D 41/22* | (2006.01) |
| *F02P 11/06* | (2006.01) |
| *G01M 15/00* | (2006.01) |
| *F02D 41/04* | (2006.01) |

(52) U.S. Cl.
CPC ............. *F02D 41/22* (2013.01); *F02D 41/042* (2013.01); *F02P 11/06* (2013.01); *F02P 17/00* (2013.01); *G01M 15/00* (2013.01); *F02N 2250/06* (2013.01); *F02N 2300/2011* (2013.01)

(58) Field of Classification Search
CPC ............. F02P 11/06; F02P 17/00; F02N 23/00; G01M 15/00
See application file for complete search history.

(56) References Cited

U.S. PATENT DOCUMENTS

| 5,964,813 A | 10/1999 | Ishii et al. | |
|---|---|---|---|
| 7,962,271 B1* | 6/2011 | Thompson ............ | G01M 15/04 324/713 |
| 2009/0323250 A1* | 12/2009 | Thompson .............. | F02P 17/00 361/264 |

FOREIGN PATENT DOCUMENTS

| JP | H11-303670 A | 11/1999 |
|---|---|---|
| JP | 2005-127239 A | 5/2005 |
| JP | 2007-076460 A | 3/2007 |
| JP | 2011-163282 A | 8/2011 |
| KR | 10-2007-0018373 | 2/2007 |

* cited by examiner

*Primary Examiner* — Erick Solis
(74) *Attorney, Agent, or Firm* — Mintz Levin Cohn Ferris Glovsky and Popeo, P.C.; Peter F. Corless

(57) ABSTRACT

A method for determining causes of engine stop using ignition power monitoring may include performing ignition power holding determination to determine, in a state in which a vehicle is started and an engine is driven, whether the vehicle is in a key-on state, to which power is consistently applied, in order to hold the starting of the engine of the vehicle. The method also includes performing power-off recognition time comparison by comparing, when ignition power is turned off and the engine is stopped, a time required to recognize ignition power-off in an ECU (Electronic Control Unit) with a preset ignition power-off recognition time for failure determination. The method also performs a power abnormality determination by determining whether the engine is stopped due to ignition power failure when the time required to recognize the ignition power-off in the ECU is not greater than the preset ignition power-off recognition time.

13 Claims, 2 Drawing Sheets

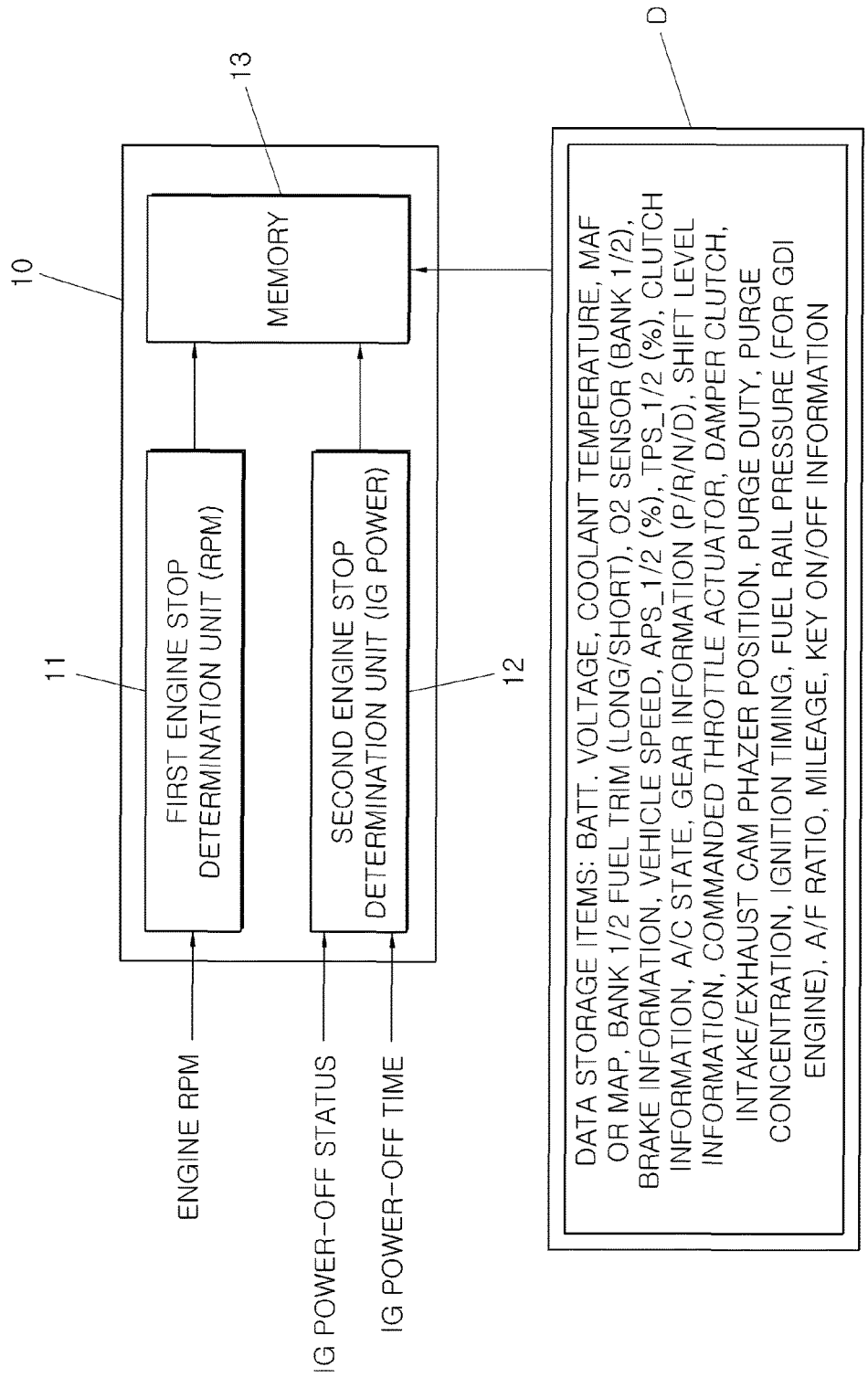

METHOD AND SYSTEM FOR DETERMINING CAUSES OF ENGINE STOP USING IGNITION POWER MONITORING

CROSS-REFERENCE TO RELATED APPLICATIONS

This application claims priority to Korean Patent Application No. 10-2014-0099169, filed on Aug. 1, 2014, which is incorporated herein by reference in its entirety.

BACKGROUND OF THE INVENTION

Field of the Invention

Exemplary embodiments of the present disclosure relate to a method and system for determining causes of engine stop and, particularly, to a method and system for determining causes of engine stop using ignition power monitoring that determines whether an engine is stopped by a key-off operation or if the engine is stopped due to ignition power failure through ignition power monitoring.

Description of Related Art

For vehicles, an Electronic control unit (ECU) stores abnormal conditions of each component as Diagnostic Trouble Codes (DTCs). Each DTC is utilized to check and repair the vehicle.

For example, failure causes of the vehicle may be easily understood by identifying the DTC through a scanner when the vehicle is serviced.

However, since some abnormal condition may not be recorded as a DTC, there is no easy way to address these problems.

For example, since the ECU does not have logic for determining whether an engine is normally stopped due to a key-off operation by a driver or if the engine is stopped due to ignition power failure, there is no easy way to address such a problem.

That is, ignition power monitoring is not carried out in the ECU. However, the ECU does control operation of the engine when starting and driving. However, when the ignition power fails in the middle of driving, the engine is stopped. In this case, even though the ignition power is normal, the ECU and DTCs do not help to determine whether the engine stop is generated due to: actual failure of the ignition power; a key-off operation; or mal-operation by the driver. The key-off operation of the driver represents an action in which the driver stops the engine by intentionally turning an ignition key or pushing a button ignition key. The mal-operation of the driver represents a key-off action in which an ignition button is pushed by driver or passenger mistakenly or an ignition key bundle is unintentionally turned by weight of a key ring with the ignition key.

SUMMARY OF THE INVENTION

An embodiment of the present disclosure is directed to a method and system for determining causes of engine stop using ignition power monitoring. The subject technology can address an engine stop phenomenon by determining whether the engine stop is generated due to ignition power failure caused by erroneous connection between ignition power and an ECU or if the engine stop is generated by an actual key-off operation such as a key-off operation or a mal-operation. The subject technology can store the determined results.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a method for determining causes of engine stop using ignition power monitoring includes performing ignition power holding determination, in a state in which a vehicle is started and an engine is driven, as to whether the vehicle is in a key-on state, to which power is consistently applied, in order to hold the starting of the engine of the vehicle. The method also performs power-off recognition time comparison, when ignition power is turned off and the engine is stopped, by comparing a time required to recognize ignition power-off in an ECU (Electronic Control Unit) with a preset ignition power-off recognition time for failure determination. Still further, the method performs power abnormality determination by determining if the engine is stopped due to ignition power failure when the time required to recognize the ignition power-off in the ECU is not greater than the preset ignition power-off recognition time for failure determination.

When the ignition power is determined to be not applied in performing ignition power holding determination, vehicle driving determination of whether the vehicle is driven may be performed. When the vehicle is determined to be driven in the performing vehicle driving determination, the performing power-off recognition time comparison may be executed.

When the engine is determined to be stopped due to the ignition power failure when performing power abnormality determination, the method performs data storage of storing a current state of the vehicle and a state of the ignition power failure as DTCs in a memory of the ECU.

The performing ignition power holding determination may be executed again after performing data storage.

The method may further include performing key-off operation determination to determine if the engine is stopped by an actual key-off operation when the time required to recognize the ignition power-off in the ECU is greater than the preset ignition power-off recognition time for failure determination.

When the engine is determined to be stopped by the key-off operation in the performing key-off operation determination, the method performs data storage of storing a current state of the vehicle and a state of the key-off operation in a memory of the ECU.

The performing ignition power holding determination may be executed again after performing data storage.

In accordance with another embodiment of the present disclosure, a method for determining causes of engine stop using ignition power monitoring includes performing ignition power holding determination in a state in which a vehicle is started and an engine is driven. The performing ignition power holding determination is whether the vehicle is in a key-on state, to which power is consistently applied, in order to hold the starting of the engine of the vehicle. The method also performs engine stall determination. Engine stall determination ascertains if the engine is stalled instead of engine stop by ignition power-off when power for driving of the engine is applied to the vehicle and an engine rpm is determined to be less than an engine rpm for stall determination during performing ignition power holding determination.

The engine rpm for stall determination may be set as 150 rpm.

When the engine is determined to be stalled in the performing engine stall determination, the method may perform data storage of storing a current state of the vehicle and a state of the engine stall in a memory of an ECU (Electronic Control Unit). The method may also perform ignition power holding determination again after the performing data storage.

In accordance with another embodiment of the present disclosure, a method and system for determining causes of engine stop using ignition power monitoring includes a first engine stop determination unit that compares an engine rpm input from an engine with a preset engine rpm for stall determination to determine whether the engine is abnormally stopped in a state in which ignition power for holding starting of the engine is normally held. The method and system also include a second engine stop determination unit that measures, in a state in which the ignition power for holding the starting of the engine is turned off, a time required to recognize ignition power-off from an off-time of the ignition power in an ECU (Electronic Control Unit) to determine whether the engine is stopped by any one of an key-off operation and ignition power failure. The method and system also have a DTC memory that records a determination result of the engine stop determined by the first and/or second engine stop determination units.

The DTC memory may store vehicle detection data detected from the engine and vehicle, together with DTCs in which causes of the engine stop are recorded.

The first and second engine stop determination units and the DTC memory may be provided in the ECU.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

The above and other objects, features and advantages of the present disclosure will be more apparent from the following detailed description taken in conjunction with the accompanying drawings.

FIG. 2 is a block diagram illustrating a system for determining causes of engine stop using ignition power monitoring according to an embodiment of the present disclosure.

DESCRIPTION OF SPECIFIC EMBODIMENTS

Figure 1:
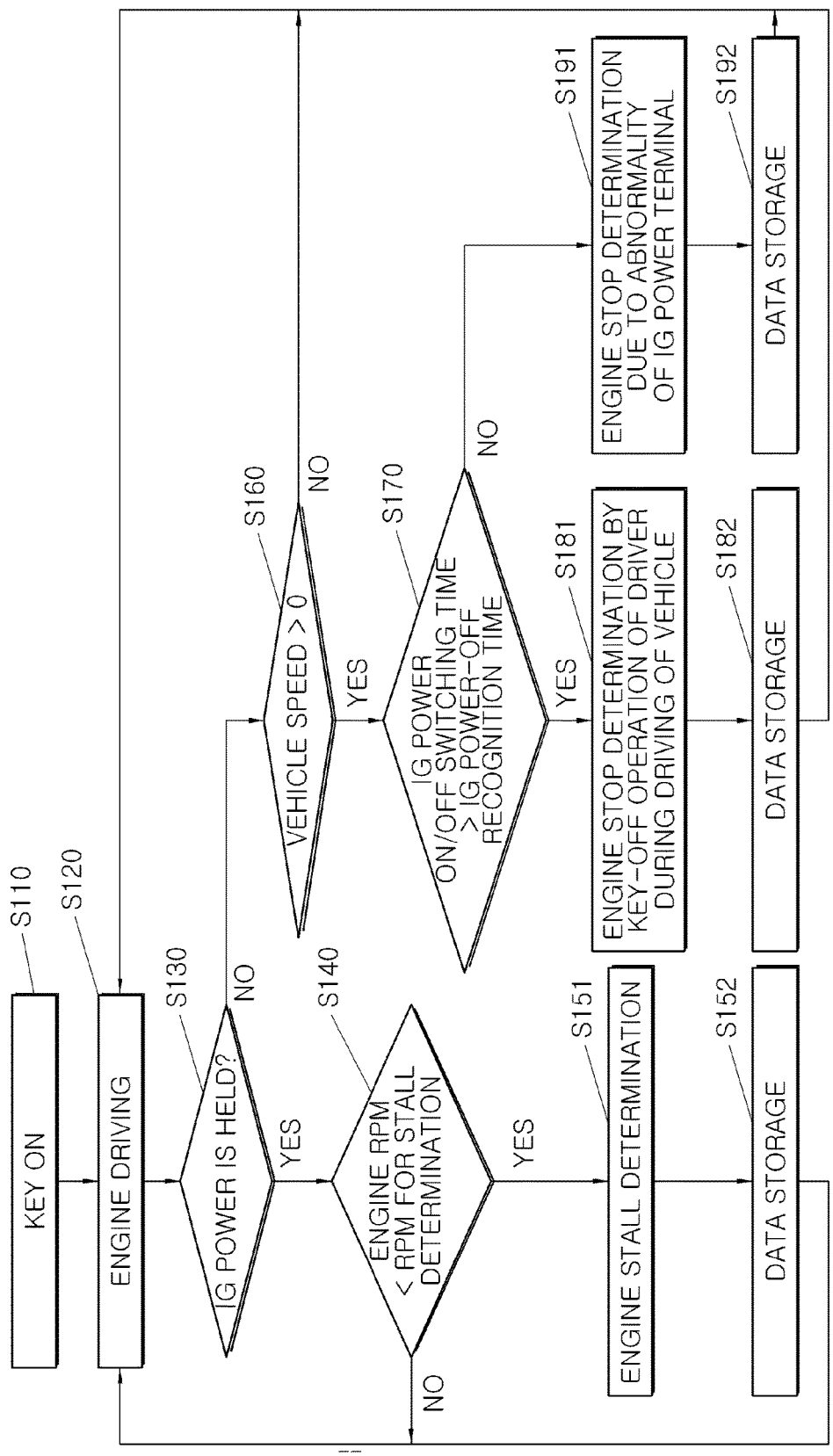
FIG. 1 is a flowchart illustrating a method for determining causes of engine stop using ignition power monitoring according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although an exemplary embodiment is described as using a plurality of units to perform the exemplary process, it is understood that the exemplary processes may also be performed by one or plurality of modules or units that are combined and arranged into fewer or more parts that provide the same functional advantages. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Systems and methods for determining causes of engine stop using ignition power monitoring according to exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Referring now to FIG. 1, a flowchart for a method for determining causes of engine stop is illustrated. The method for determining causes of engine stop uses ignition power monitoring. At step S110, the ignition is in a key on state. The vehicle starting step S110 is a step in which a driver performs a key-on operation in order to drive the vehicle. When an ignition key of the vehicle is a button type, the driver pushes the ignition button to start the engine. When the ignition key of the vehicle is a typical key type, the driver turns the ignition key to start the engine.

At step S120, the engine is being driven. In the engine driving step S120, a series of operations for starting the engine through the vehicle starting step S110 are transferred to the engine and the engine is driven.

At step S130, the method performs an ignition power holding determination to determine, in the state in which a vehicle is started and an engine is driven, whether the vehicle is in a key-on state, to which power is consistently applied, in order to hold the key in the position for starting of the engine of the vehicle. If the result of step S130 is yes, the method proceeds to step S140. If the result of step S130 is no, the method proceeds to step S160.

The ignition power holding determination step S130 is a step of determining whether the vehicle is in a key-on state, to which the power is consistently applied, in order to hold the starting of the engine. In the key-on state, since the power is applied by an ignition plug of the engine, the starting of the engine may be consistently held.

At step S160, the method performs a vehicle driving determination in a state in which the starting power for driving of the engine is not supplied to the engine and the engine is stopped. Accordingly, the vehicle driving determination step S160 is a step of determining whether the speed of the vehicle is higher than zero. In other words, the method determines if the engine stop is caused by the ignition power-off.

At step S170, a power-off recognition time comparison is performed by comparing, when ignition power is turned off and the engine is stopped, a time required to recognize ignition power-off in an ECU (Electronic Control Unit) with a preset ignition power-off recognition time for failure determination, a key-off operation determination step S181 of determining that the engine is stopped by a key-off operation when the time required to recognize ignition power-off in the ECU is greater than the preset ignition power-off recognition time for failure determination, and a power abnormality determination step S191 of determining that the engine is stopped due to ignition power failure when the time required to recognize ignition power-off in the ECU is not greater than the preset ignition power-off recognition time for failure determination. If the result of step S160 is yes, the method proceeds to step S170. If the result of step S160 is yes (e.g., the vehicle is not being driven), the method returns to the engine driving step S120.

At step S170, the method performs a power-off recognition time comparison by comparing the time required to recognize ignition power-off in the ECU with the preset ignition power-off recognition time for failure determination when the ignition power in the engine driven by the key-on is turned off and the engine is stopped.

The ignition power-off recognition time for failure determination becomes a reference for determining whether the ignition power failure is generated by a key-off operation of the driver or by abnormality of an ignition power terminal. That is, when the driver stops the engine by the key-off operation, it takes a certain time to recognize the ignition power-off in the ECU. Accordingly, a time required to recognize ignition power-off by the key-off operation in the ECU is set as an ignition power-off recognition time for failure determination, and the time required to recognize ignition power-off in the ECU is compared with the ignition power-off recognition time for failure determination. Here, the ignition power-off recognition time for failure determination may be set as 100 ms.

Depending upon the results of step S170, the method may proceed to step S181 when the ignition power switching time is greater than the ignition power-off time, or step S191 when the ignition power switching time is less than or equal to the ignition power-off time. Therefore, when the vehicle is driven, the key-off operation determination step S181 or the power abnormality determination step S191 with respect to the engine stop is performed. When the vehicle is not driven, the process is returned to the engine driving step S120.

The key-off operation determination step S181 is performed when the time required to recognize ignition power-off in the ECU is greater than the ignition power-off recognition time for failure determination. The key-off operation determination step S181 is a step of determining that the engine is stopped by an actual ignition key-off operation, instead of abnormality of an ignition power section. The key-off operation determination step S181 determines that the key-off operation is generated by the mistake or maloperation of the driver even though the driver does not recognize the same or the actual key-off operation such as a key-off operation in an unintended state is generated. For example, the key-off operation represents a case in which the driver or the passenger stops the engine by pushing an ignition button by mistake or in an unintended state in the vehicle provided with a button ignition key, a case in which the engine is stopped by turning of a key bundle regardless of the driver's intention by hanging a heavy key ring to a typical ignition key, or the like.

After performing step S181, the method proceeds to step S182. At step S182, data storage is performed to store data in the ECU when the engine is determined to be stopped by the ignition key-off operation, instead of abnormality of the ignition power terminal, in the key-off operation determination step S181.

Meanwhile, data D stored in a memory of the ECU in the data storage step S182 may include ignition key on/off information, battery voltage, coolant temperature, MAF (Mass Air Flow) sensor values or MAP (Manifold Absolute Pressure) sensor values, a catalytic deactivation degree for each cylinder bank, an oxygen sensor value for each cylinder bank, brake information, vehicle speed, APS (Acceleration Position Sensor) output values, TPS (Throttle Position Sensor) output values, clutch information, an A/C state, gear information (P/R/N/D), shift level information, a commanded throttle actuator, a damper clutch, an intake/exhaust CAM phazer position, purge duty, purge concentration, ignition timing, fuel rail pressure (for a GDI engine), an A/F ratio, a total mileage of the vehicle, etc.

At step S191, the method determines the power abnormality determination that the engine is stopped due to abnormality of the ignition power terminal. When the time required to recognize ignition power-off in the ECU is not greater than the preset ignition power-off recognition time for failure determination in the power-off recognition time comparison step S170, the power abnormality determination step S191 determines that the engine stop is not generated by the key-off operation, but is generated due to abnormality of the ignition power.

After performing step S191, the method proceeds to step S192. At step S192, data storage is also performed after the power abnormality determination step S191 is performed, and thus the generation of the engine stop due to the abnormality of the ignition power terminal is recorded as DTC in the ECU. In this case, various sorts of information of the vehicle and the engine are recorded together in the data storage step S192, similarly to in the data storage step S182 performed after the key-off operation determination step S181.

Still referring to FIG. 1, when the ignition power for holding starting of the vehicle is determined to be held in the key-on state in the ignition power holding determination step S130, an engine rpm comparison step S140 is performed.

At step S140, the method performs engine rpm comparison by comparing an engine rpm (revolution per minute) with a preset engine rpm for stall determination. Here, the engine rpm for stall determination is a reference rpm for determining that the engine is in a stall state. The engine rpm for stall determination may be set as 150 rpm.

If the engine rpm is determined to be less than the preset engine rpm for stall determination in the engine rpm comparison step S140, the method proceeds to step S151. At step S151, an engine stall determination determines that the engine is abnormally stopped instead of being stopped by the ignition power-off. After the engine stall determination step S151, a data storage step S152 is performed, and thus the engine stall is recorded as DTC. Various sorts of information of the vehicle and the engine are recorded together in the data storage step S152, similarly to in the other data storage steps S182 and S192.

Alternatively at step S140, when the engine rpm is determined to be greater than the preset engine rpm for stall determination in the engine rpm comparison, the engine is not stopped and the process is returned to the engine driving step S120.

When the data storage steps S152, S182, and S192 are respectively performed after the engine stall determination step S151, the key-off operation determination step S181, and the power abnormality determination step S191 are performed, the process is returned to the previous step of the ignition power holding determination step S130, namely, to the engine driving step S120 so that the logic is performed again.

Referring now to FIG. 2, a system 10 for determining causes of engine stop using ignition power monitoring according to an embodiment of the present disclosure will be described.

The system 10 for determining causes of engine stop using ignition power monitoring according to an embodiment of the present disclosure includes a first engine stop determination unit 11. The first engine stop determination unit 11 compares an engine rpm input from an engine with a preset rpm for stall determination and determines whether the engine is abnormally stopped in a state in which ignition power for holding starting of the engine is normally held. The system 10 has a second engine stop determination unit 12 which measures, in a state in which the ignition power for holding starting of the engine is turned off, a time required to recognize ignition power-off from an off-time of the ignition power in an ECU (Electronic Control Unit) and determines whether the engine is stopped by any one of an key-off operation and ignition power failure. The system 10 also has memory 13 in which a result of the engine stop determined by the first or second engine stop determination unit 11 or 12 is recorded.

The first engine stop determination unit 11 is provided with engine rpm data in a state in which power for holding starting of the engine is supplied. The first engine stop determination unit 11 compares the engine rpm with a preset engine rpm for stall determination, and determines whether the engine is abnormally stopped. As described in the engine rpm comparison step S140, the engine rpm for stall determination may be set as 150 rpm.

The second engine stop determination unit 12 measures, in a state in which the ignition power for holding starting of the engine is turned off, a time required to recognize ignition power-off from an off-time of the ignition power in the ECU and determines whether the engine is stopped by the key-off operation or the ignition power failure. When the time required to recognize ignition power-off from the off-time of the ignition power in the ECU is greater than a preset ignition power-off recognition time for failure determination, it is determined that the ignition power is turned off by a key-off operation of a driver or passenger even though the driver or the passenger does not recognize the same. When the time required to recognize ignition power-off in the ECU is not greater than the preset ignition power-off recognition time for failure determination, it is determined that the engine is stopped due to the ignition power failure. As described in the power-off recognition time comparison step S170, the ignition power-off recognition time for failure determination may be set as 100 ms.

When the ignition power is blocked by the key-off operation in the second engine stop determination unit 12, it is determined that the vehicle is normal. Accordingly, it may be possible to inform the driver of the mal-operation through the DTC. When the engine is stopped due to the ignition power failure, the maintenance of the ignition power terminal is performed so that the vehicle may be held in a normal state.

The memory 13 records the engine stop determination result determined by the first or second engine stop determination unit 11 or 12 as DTCs. Since the engine stop determination result is recorded, causes of the engine stop may be accurately grasped by scanning the records of the memory 13 during maintenance. Consequently, it may be possible to repair trouble parts or inform the driver that the vehicle does not fail.

The memory 13 stores data detected from the vehicle and the engine, namely, vehicle detection data D together, as well as the DTCs determined by the first and second engine stop determination units 11 and 12. As described above, the vehicle detection data D includes ignition key on/off information, battery voltage, coolant temperature, MAF (Mass Air Flow) sensor values or MAP (Manifold Absolute Pressure) sensor values, a catalytic deactivation degree for each cylinder bank, an oxygen sensor value for each cylinder bank, brake information, vehicle speed, APS (Acceleration Position Sensor) output values, TPS (Throttle Position Sensor) output values, clutch information, an A/C state, gear information (P/R/N/D), shift level information, a commanded throttle actuator, a damper clutch, an intake/exhaust CAM phazer position, purge duty, purge concentration, ignition timing, fuel rail pressure (for a GDI engine), an A/F ratio, a total mileage of the vehicle, etc.

The system 10 uses the first engine stop determination unit 11, the second engine stop determination unit 12, and the memory 13 for determining causes of engine stop using ignition power monitoring according to the embodiment of the present disclosure and stores the results in the ECU. Thus, the above-mentioned method for determining causes of engine stop using ignition power monitoring is performed by the system 10 of FIG. 2.

In accordance with the subject technology, since causes of engine stop are stored in an ECU, an engine stop phenomenon may be properly addressed in the field. The engine stop phenomenon due to ignition power failure may be basically resolved by analyzing data stored in the ECU if the engine stop is generated due to the ignition power failure.

In addition, when a driver recognizes the engine stop phenomenon of a vehicle as failure of the vehicle, the driver identifies whether the engine stop is generated due to the ignition power failure or the engine stop is generated due to a mal-operation unrecognized by the driver such as pushing of a button ignition key in an unrecognized state or turning of an ignition key with a heavy key ring by DTCs stored in the ECU. Consequently, a customer claim may be resolved.

While the present disclosure has been described with respect to the specific embodiments, it will be apparent to those skilled in the art that various changes and modifications may be made without departing from the spirit and scope of the invention as defined in the following claims.

What is claimed is:

1. A method for determining causes of engine stop using ignition power monitoring, the comprising the steps of:
   in a state in which a vehicle is started and an engine is driven, performing ignition power holding determination to determine whether the vehicle is in a key-on state, to which power is consistently applied, in order to hold a condition of starting of the engine of the vehicle;
   when ignition power is turned off and the engine is stopped, performing power-off recognition time comparison to compare a time required to recognize ignition power-off in an Electronic Control Unit (ECU) with a preset ignition power-off recognition time for failure determination; and
   performing power abnormality determination to determine if the engine is stopped due to ignition power failure based upon the time required to recognize the ignition power-off in the ECU is not greater than the preset ignition power-off recognition time.

2. The method of claim 1, further comprising the steps of:
   when the ignition power is determined to be not applied by performing ignition power holding determination, performing vehicle driving determination to determine whether the vehicle is driven; and
   when the vehicle is driven, performing power-off recognition time comparison.

3. The method of claim 1, further comprising the step of:
   when the engine is determined to be stopped due to the ignition power failure in the performing power abnormality determination, storing a current state of the vehicle and a state of the ignition power failure as DTC in a memory of the ECU.

4. The method of claim 3, wherein the performing ignition power holding determination is executed again after storing the current state.

5. The method of claim 1, further comprising performing key-off operation determination to determine whether the engine is stopped by an actual key-off operation when the time required to recognize the ignition power-off in the ECU is greater than the preset ignition power-off recognition time.

6. The method of claim 5, further comprising the step of:
   wherein when the engine is determined to be stopped by the key-off operation in the performing key-off operation determination, performing data storage of storing a current state of the vehicle and a state of the key-off operation in a memory of the ECU.

7. The method of claim 6, wherein the performing ignition power holding determination is executed again after performing the data storage.

8. A method for determining causes of engine stop using ignition power monitoring, comprising the steps of:
   in a state in which a vehicle is started and an engine is driven, performing ignition power holding determination to determine whether the vehicle is in a key-on state, to which power is consistently applied, in order to hold the starting of the engine of the vehicle; and
   performing engine stall determination to determine if the engine is stalled instead of stopped by ignition power-off when power for driving of the engine is applied to the vehicle and an engine rpm is determined to be less than an engine rpm for stall determination during performing the ignition power holding determination.

9. The method of claim 8, wherein the engine rpm for stall determination is set as 150 rpm.

10. The method of claim 8, further comprising the steps of:
    when the engine is determined to be stalled in the performing engine stall determination, performing data storage of storing a current state of the vehicle and a state of the engine stall in a memory of an ECU (Electronic Control Unit); and
    executing the performing ignition power holding determination again after performing the data storage.

11. A system for determining causes of engine stop using ignition power monitoring, comprising:
    a first engine stop determination unit for: comparing an engine rpm input from an engine with a preset engine rpm for stall determination; and determining whether the engine is abnormally stopped in a state in which ignition power for holding starting of the engine is normally held;
    a second engine stop determination unit for: measuring, in a state in which the ignition power for holding the starting of the engine is turned off, a time required to recognize ignition power-off from an off-time of the ignition power in an Electronic Control Unit (ECU); and determining whether the engine is stopped by any one of an key-off operation and ignition power failure; and
    a DTC memory for recording determination results related to engine stops determined by the first and/or second engine stop determination units.

12. The system of claim 11, wherein the DTC memory stores vehicle detection data detected from the engine and the vehicle, together with Diagnostic Trouble Codes (DTCs) in which causes of the engine stop are recorded.

13. The system of claim 11, wherein the first and second engine stop determination units and the DTC memory are provided in the ECU.

* * * * *